(12) United States Patent
Li et al.

(10) Patent No.: US 11,025,110 B2
(45) Date of Patent: Jun. 1, 2021

(54) BRUSHLESS DIRECT CURRENT MOTOR AND DUAL CLUTCH TRANSMISSION THEREOF

(71) Applicant: Johnson Electric International AG, Murten (CH)

(72) Inventors: Yongbin Li, Hong Kong (CN); Hai Chen, Hong Kong (CN); Xianchun Fan, Hong Kong (CN); Guowei Zhong, Hong Kong (CN); Jinbao Sun, Hong Kong (CN)

(73) Assignee: Johnson Electric International AG, Murten (CH)

( * ) Notice: Subject to any disclaimer, the term of this patent is extended or adjusted under 35 U.S.C. 154(b) by 131 days.

(21) Appl. No.: 16/136,559

(22) Filed: Sep. 20, 2018

(65) Prior Publication Data

US 2019/0097481 A1 Mar. 28, 2019

(30) Foreign Application Priority Data

Sep. 21, 2017 (CN) .......................... 201710862370.X

(51) Int. Cl.

| H02K 1/27 | (2006.01) |
|---|---|
| H02K 1/14 | (2006.01) |
| H02K 1/28 | (2006.01) |
| H02K 7/108 | (2006.01) |
| H02K 21/16 | (2006.01) |
| H02K 5/22 | (2006.01) |
| F16D 21/00 | (2006.01) |

(52) U.S. Cl.
CPC ........... *H02K 1/2773* (2013.01); *H02K 1/146* (2013.01); *H02K 1/28* (2013.01); *H02K 5/225* (2013.01); *H02K 7/108* (2013.01); *H02K 21/16* (2013.01); *F16D 21/00* (2013.01); *H02K 2213/03* (2013.01)

(58) Field of Classification Search
CPC ...... F16D 21/00; H02K 1/146; H02K 1/2773; H02K 1/28; H02K 21/16; H02K 2213/03; H02K 7/108; H02K 5/225
See application file for complete search history.

(56) References Cited

U.S. PATENT DOCUMENTS

| 7,663,282 B2 * | 2/2010 | Ogava .................. H02K 7/1008 310/156.56 |
|---|---|---|
| 9,401,628 B2 * | 7/2016 | Schneider .............. H02K 1/272 |
| 2004/0113506 A1 * | 6/2004 | Okubo ................... H02K 21/16 310/156.43 |

(Continued)

*Primary Examiner* — Bernard Rojas

(57) ABSTRACT

A brushless direct current motor and a dual clutch transmission employing the motor are provided. The motor includes a stator including stator core and a winding wound around the stator core, and a rotor rotatable relative to the stator. The rotor includes a shaft, a rotor core fixed to the shaft, and a plurality of permanent magnets. The rotor core is fixed to the shaft and includes a plurality of accommodations arranged along a circumferential direction of the rotor. Each of the accommodations substantially extends along a radial direction and an axial direction of the rotor. The permanent magnets are respectively arranged at corresponding accommodations. A relationship of an axial length Lr of the rotor core, an axial length Lm of each of the permanent magnets, and an axial length Ls of the stator core is Lm>Lr≥Ls.

14 Claims, 7 Drawing Sheets

(56) References Cited

U.S. PATENT DOCUMENTS

| | | | |
|---|---|---|---|
| 2012/0001509 A1* | 1/2012 | Yamada | H02K 1/278 310/156.15 |
| 2014/0028121 A1 | 1/2014 | Bekavac et al. | |
| 2015/0076950 A1* | 3/2015 | Asao | H02K 1/278 310/156.38 |
| 2015/0303751 A1 | 10/2015 | Ekin et al. | |
| 2016/0149461 A1 | 5/2016 | Kono et al. | |
| 2016/0197541 A1* | 7/2016 | Okubo | H02K 1/276 310/156.08 |
| 2019/0103791 A1* | 4/2019 | Goel | H02K 1/272 |

\* cited by examiner

BRUSHLESS DIRECT CURRENT MOTOR AND DUAL CLUTCH TRANSMISSION THEREOF

CROSS REFERENCE TO RELATED APPLICATIONS

This non-provisional patent application claims priority under 35 U.S.C. § 119(a) from Patent Application No. 201710862370.X filed in The People's Republic of China on Sep. 21, 2017.

FIELD OF THE DISCLOSURE

This present disclosure relates to a brushless direct current (DC) motor, and a dual clutch transmission employing the motor.

BACKGROUND OF THE DISCLOSURE

With the development of human industry, power machinery plays an increasing role in various production fields. Brushless (DC) motors are widely used in various power devices due to their superior power matching characteristic.

A current brushless motor includes a spoke type rotor and a winding stator surrounding the rotor. The winding stator includes an annular stator core. The rotor includes a shaft, a rotor core fixed to the shaft, and a plurality of permanent magnets respectively extend in radial directions and an axial direction of the rotor and uniformly arranged inside the rotor core along a circumferential direction.

However, how to improve the performance of the spoke type motor is a problem to be solved.

SUMMARY

Thus, there is a desire for a brushless DC motor with good performance.

According to one aspect, a brushless DC motor is provided which includes a stator including a stator core and a winding wound around the stator core, and a rotor rotatable relative to the stator. The rotor includes a shaft, a rotor core and a plurality of permanent magnets. The rotor core includes a plurality of accommodations arranged along a circumferential direction of the rotor, each of the accommodations substantially extending along a radial direction and an axial direction of the rotor. The permanent magnets respectively arranged at corresponding accommodations. A relationship of an axial length Lr of the rotor core, an axial length Lm of each of the permanent magnets, and an axial length Ls of the stator core is Lm>Lr≥Ls.

According to another aspect, a dual clutch transmission is provided, which includes a brushless DC motor as defined above.

The rotor of the present disclosure is a spoke type rotor. The relationship of the axial length Lr of the rotor core, the axial length Lm of each permanent magnet and the axial length Ls of the stator core is designed as Lm>Lr≥Ls. As a result, the performance of the motor can be improved.

BRIEF DESCRIPTION OF THE DRAWINGS

A preferred embodiment of the disclosure will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
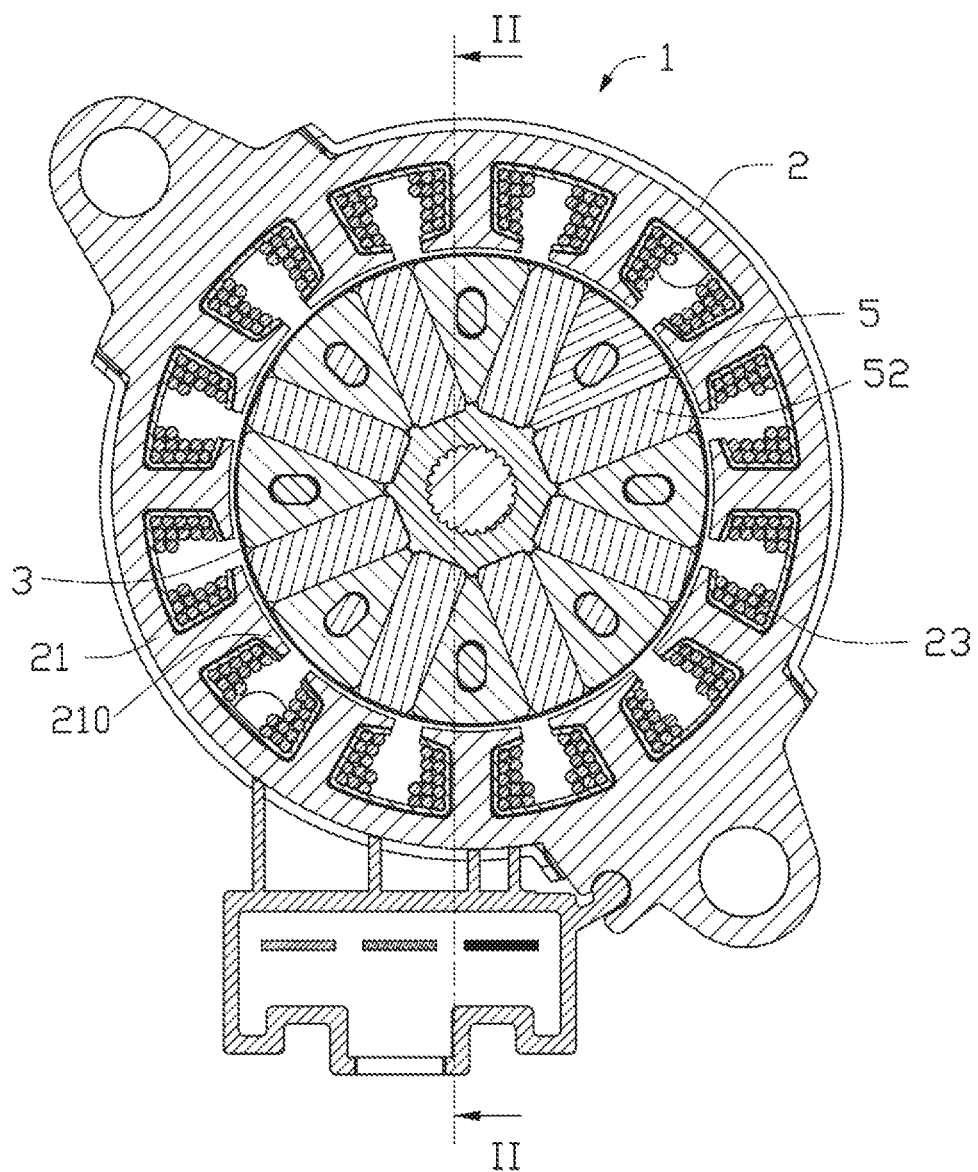
FIG. 1 is a radial sectional view of a brushless DC motor according to a preferred embodiment of the present disclosure.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

FIG. 1 is a radial sectional view of a brushless DC motor 1 according to a preferred embodiment of the present disclosure. The motor 1 includes a stator 2 and a rotor 5 rotatable relative to the stator 2. The stator 2 includes a stator core (not labelled) and a winding 23 wound around the stator core. The stator core may be formed by laminating a plurality of core laminations. The stator core includes an annular yoke 21 and a plurality of teeth 210 protruding from an inner surface of the annular yoke 21. A gap 2 is formed between radial inner surfaces of the teeth 210 and an outer surface of the rotor 5, for ensuring a rotation of the rotor 5.

Figure 2:
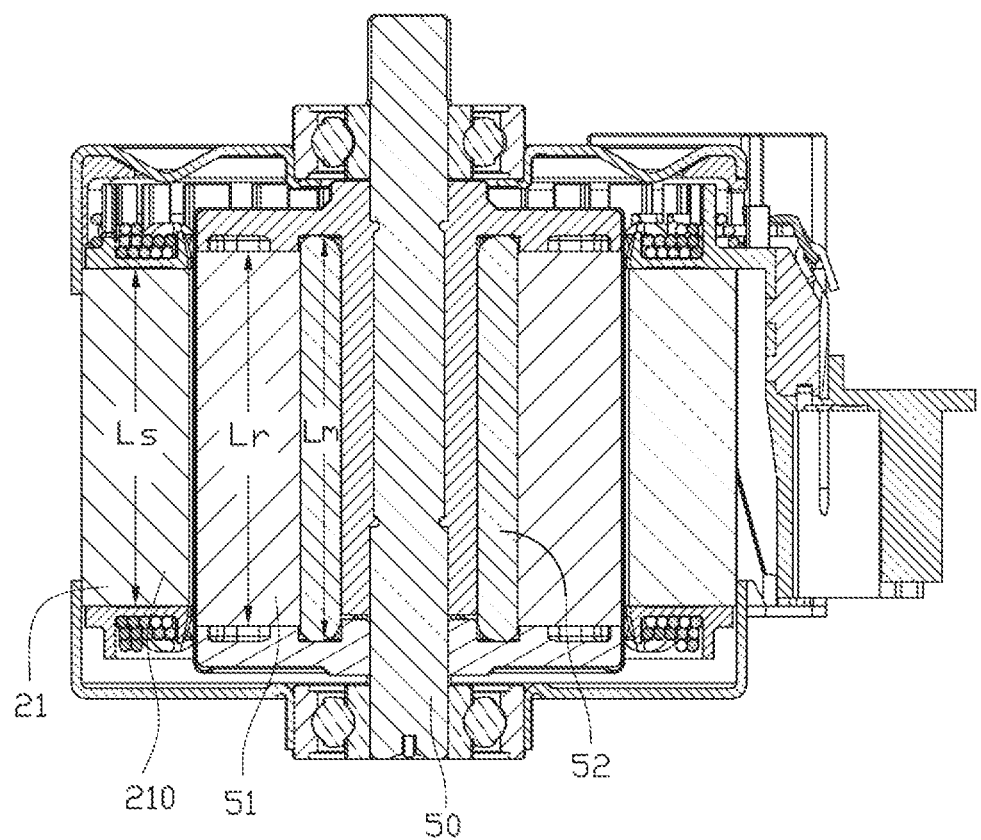
FIG. 2 is an axial sectional view of the brushless DC motor of FIG. 1 along a section line II-II.

FIG. 2 is an axial sectional view of the brushless DC motor 1. The annular yoke 21 and the teeth 210 of the stator core have the same axial length. The rotor 5 is a spoke type rotor, including a shaft 50, a rotor core 51 arranged around the shaft 50 and a plurality of permanent magnets 52. The rotor core 51 may be formed by laminating a plurality of core laminations, and includes a plurality of accommodations (not labelled) evenly arranged along a circumference direction. Each accommodation extends along a radial direction and an axial direction of the rotor 5. The permanent magnet 52 has a shape corresponding to the accommodation, and is fixed into the corresponding accommodation. In the embodiment, the stator 1 includes twelve teeth 210, and the rotor 5 has eight permanent magnet 52. It should be understood that the number of the teeth 210 and the number of the permanent magnet 52 are not limited, which also can be different.

The relationship of an axial length Lr of the rotor core 51, an axial length Lm of each permanent magnet 52, and an axial length Ls of the stator core is Lm>Lr>Ls. Preferably, the axial length Lr of the rotor core 51 satisfies the following formula (1). Optimally, the axial length Lr of the rotor core 51 satisfies the following formula (2). In the axial direction of the rotor, the permanent magnet 52 extends beyond two axial ends of the rotor core 51, and the rotor core 51 extends beyond two axial ends of the stator core. Preferably, two portions of the permanent magnet 52 beyond the rotor core 51 in the axial direction have the same axial length. Preferably, two portions of the rotor core 51 beyond the stator core in the axial direction have the same axial length.

$$Lr=0.4\sim0.8*(Lm-Ls)+Ls \tag{1}$$

$$Lr=0.5\sim0.7*(Lm-Ls)+Ls \tag{2}$$

Figure 3:
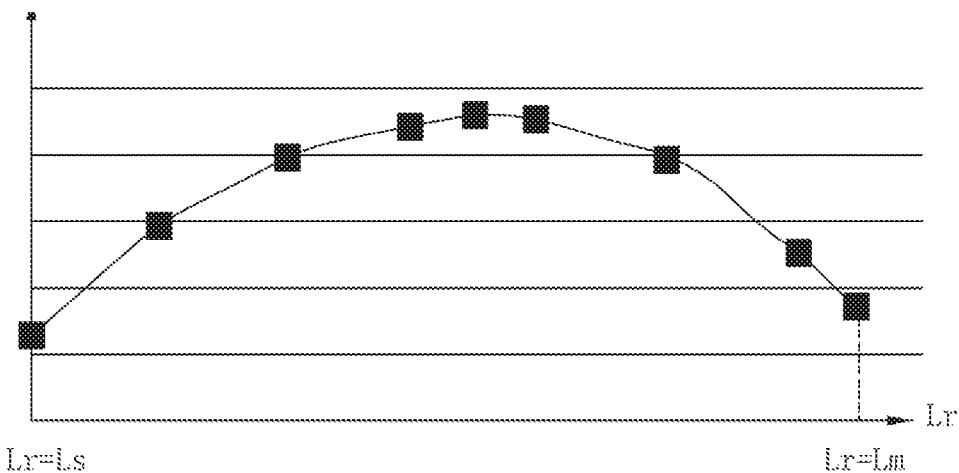
FIG. 3 is a waveform diagram of a magnetic flux of the motor of FIG. 1, showing that the magnetic flux varies with an axial length of a rotor core.

FIG. 3 is a waveform diagram of a magnetic flux of the motor of FIG. 1, wherein both the axial length Ls of the stator core and the axial length Lm of each permanent magnet are constant, and the axial length Lr is gradually increased from Ls to Lm. As shown in FIG. 3, a variation of the magnetic flux of the motor 1 is parabolic. When the axial length Lr of the rotor core 51 is within a range of expressed by the formula (1), the motor has a relatively large magnetic flux. In addition, as the axial length Lr is smaller than the axial length Lm of each permanent magnet 52, the rotor 5 has a relatively low weight and rotor inertia. Therefore, the motor 1 has a better performance.

Figure 4:
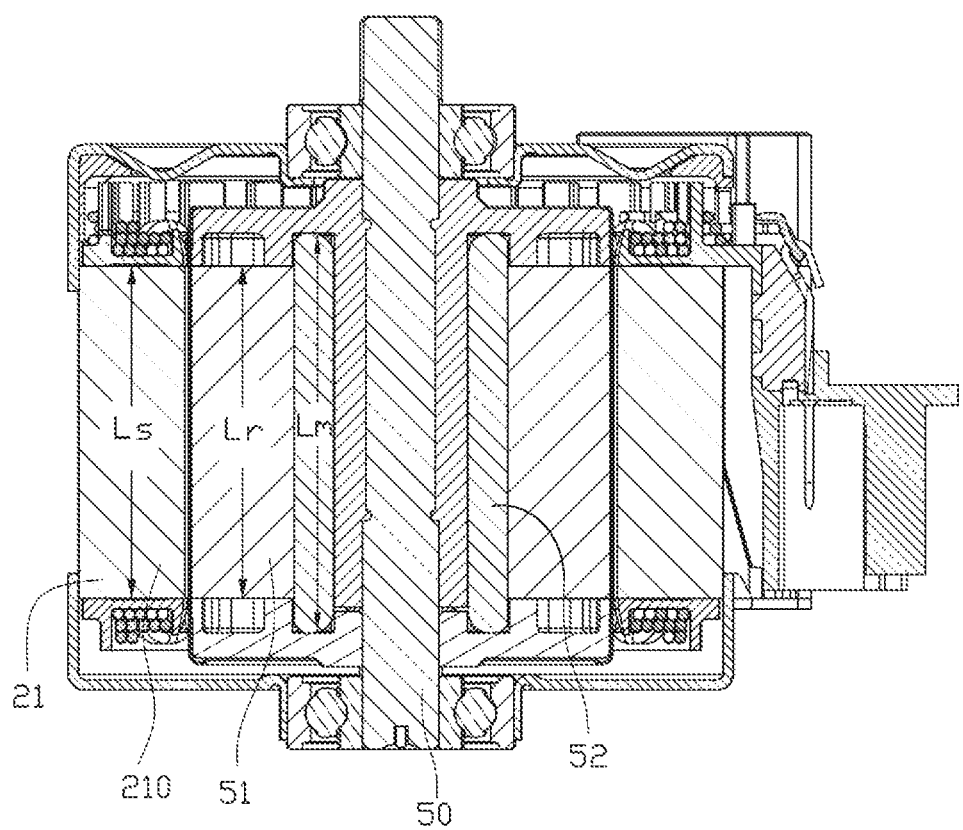
FIG. 4 is an axial sectional view of a brushless DC motor according to another embodiment of the present disclosure.

FIG. 4 is an axial sectional view of a brushless DC motor according to another embodiment of the present disclosure. The main difference between this motor and the motor shown in FIG. 2 is that, The relationship of an axial length Lr of the rotor core 51, an axial length Lm of each permanent magnet 52, and an axial length Ls of the stator core is Lm>Lr=Ls. In the embodiment, the rotor 5 has a lower weight and rotor inertia, which is beneficial for starting the motor.

FIGS. 5 to 8 illustrate the rotor 5 of the brushless DC motor 1 of FIG. 1. In the illustrated embodiment, the rotor 5 is pre-assembled, and then arranged inside the stator 2 of the motor 1. The rotor core 51 includes a plurality of core units 70 arranged along the circumference direction. In this embodiment, the core units 70 are separate, each of which is substantially column-shaped with a sector-shaped or triangular cross section. In an alternative embodiment, the radially inner sides of the core units 70 may be connected together to become an integral rotor core. The core units 70 and the permanent magnets 52 are alternately arranged along the circumferential direction to form a column. The rotor 5 further includes two end plates 40, 60, and a rotor housing 30. The end plates 40, 69 are respectively arranged at two axial ends of the column. The rotor housing 30 surrounds the column. The shaft 50 passes through the column along the axial direction.

The rotor housing 30 may be made of magnetically permeable material, preferably of magnetically permeable stainless steel. In the embodiment, the rotor housing 30 is a hollow cylinder. Preferably, the rotor housing 30 further includes two flanges respectively extending radially inward from two axial ends of the rotor housing 30. The rotor housing 30 is sleeved on a periphery of the core units 70 and the permanent magnets 52, and the two flanges 32 abut the two end plates 40, 60 respectively, so the rotor is pre-assembled as a whole. Preferably, an inner surface of the rotor housing 30 and an outer surface of the column formed by the core units 70 and the permanent magnets 52 are coated with glue for a more stable fixation of them.

In the other embodiments, the rotor housing 30 is made in two parts, each of which forms a hollow cylinder and a flange extending radially inward from an axial end of the cylinder. The two parts of the housing are mounted on the core units 70 and the permanent magnets 52 from opposite axial ends, respectively.

Figure 5:
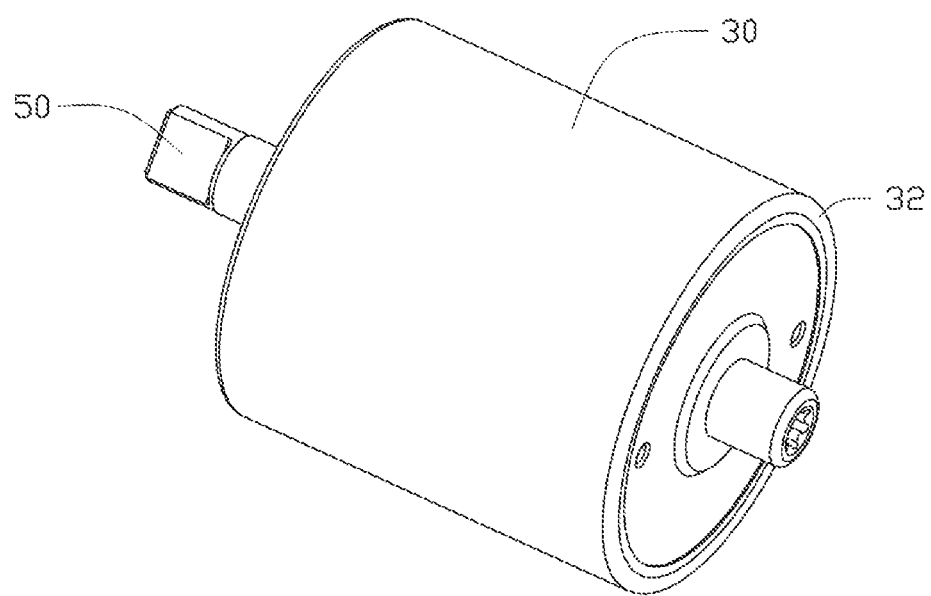
FIG. 5 is a perspective view of a rotor of the brushless DC motor of FIG. 1.
Figure 6:
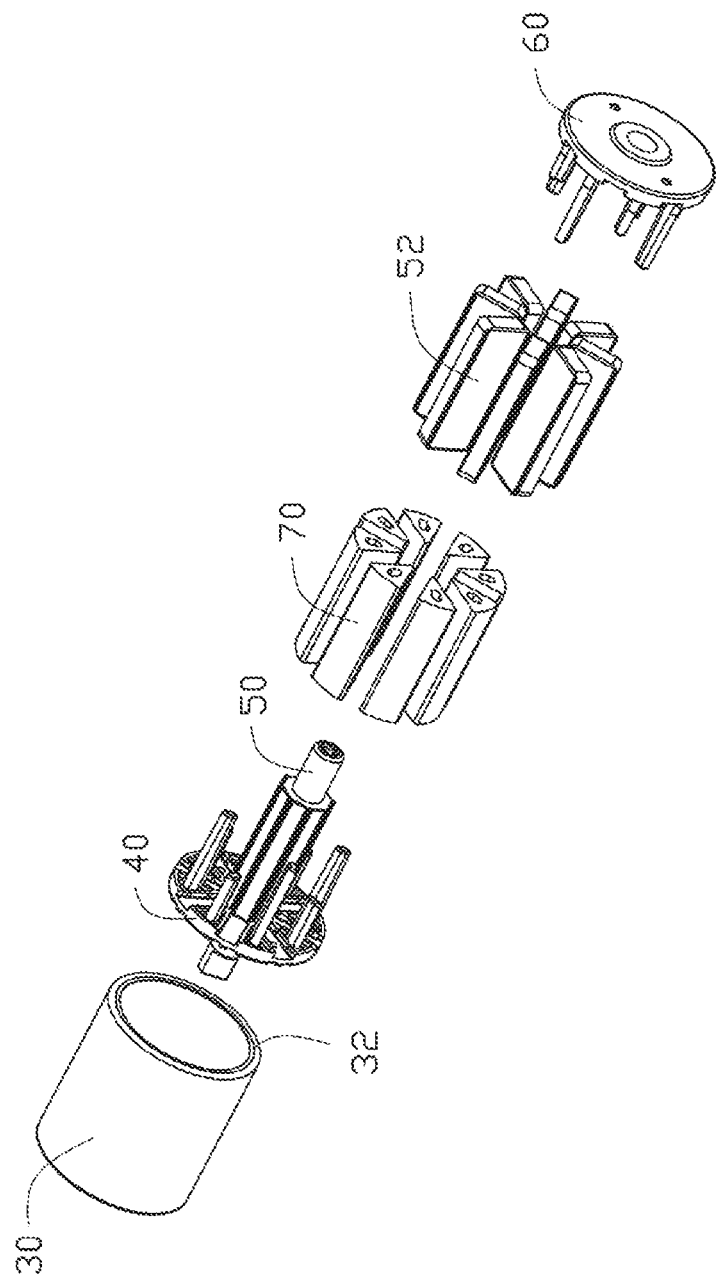
FIG. 6 is an exploded view of the rotor of FIG. 5.
Figure 7:
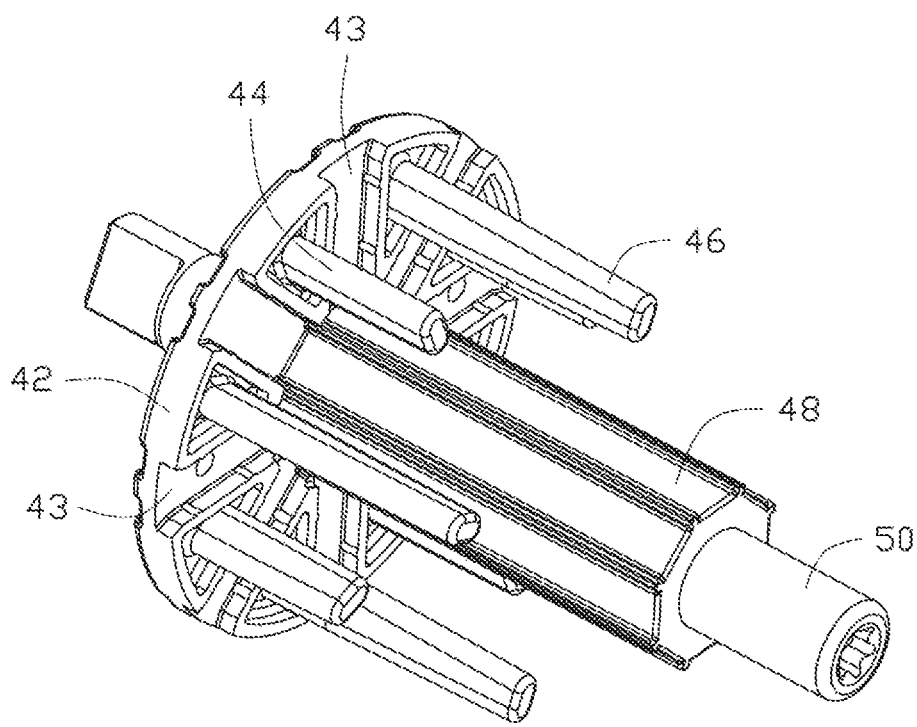
FIG. 7 illustrates a first end plate of the rotor of FIG. 5.
Figure 9:
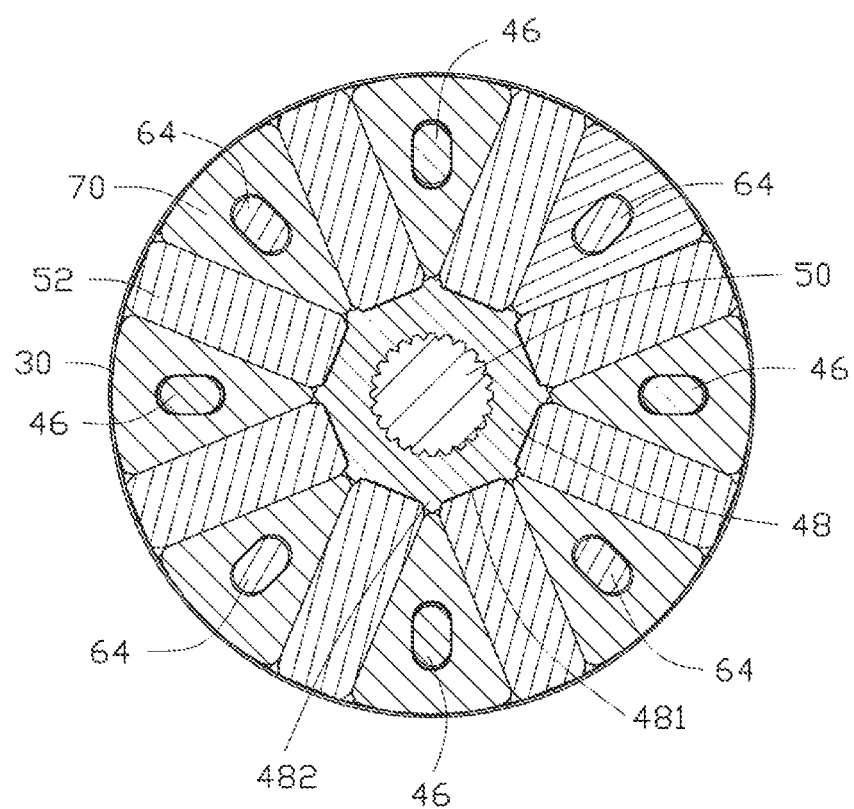
FIG. 9 is a radial sectional view of the rotor of FIG. 5.

FIG. 7 illustrates a first end plate of the rotor of FIG. 5. In the embodiment, the first end plate 40 includes a first main body 42, a first short pins 44, a first long pins 46, and a first sleeve 48. The first main body 42 is substantially disc-shaped, and has a plurality of first grooves 43 formed on an end surface of the first main body 42. The first grooves 43 are configured to receive the upper portion of the permanent magnet 52 extending outside the rotor core 51. Preferably, the permanent magnet 52 is press-fitted to the corresponding first groove 43. The first short pins 44 and the first long pins 46 are arranged around an axis of the first main body 42 and evenly spaced from each other. Each of the first pins 44, 46 is located between adjacent first grooves 43, extending perpendicularly from the end surface of the first main body 42. The first sleeve 48 is substantially prismatic and arranged at the axis of the first main body 42. Referring to FIG. 9, a cross-section of the first sleeve 48 is substantially polygonal. In the embodiment, the cross-section of the first sleeve 48 is octagon-shaped. Each sidewall of the first sleeve 48 contacts a corresponding permanent magnet 52. Each corner of the first sleeve 48 extends radially outward to form a rib 482. Each rib 482 contacts a corresponding core unit 70. The first sleeve 48 has a through hole (not labelled) to allow passage of the shaft 50 therethrough.

Preferably, the first main body 42, the first short pins 44, the first long pins 46 and the first sleeve 48 are integrally formed as one piece through injection molding, and the first end plate 40 and the shaft 50 are integrally formed through insert molding. The shaft 50 is fixed into and rotatable with the first sleeve 48. It should be understood that the first main body 42, the first pins 44, 46, and the first sleeve 48 can be formed separately and then assembled together.

In the embodiment, the first short pins 44 and the first long pins 46 each have a cross section that is oval-shape with the major axis thereof extending radially. The first short pins 44 and the first long pins 46 each are four in number and circumferentially and alternately spaced from each other.

Figure 8:
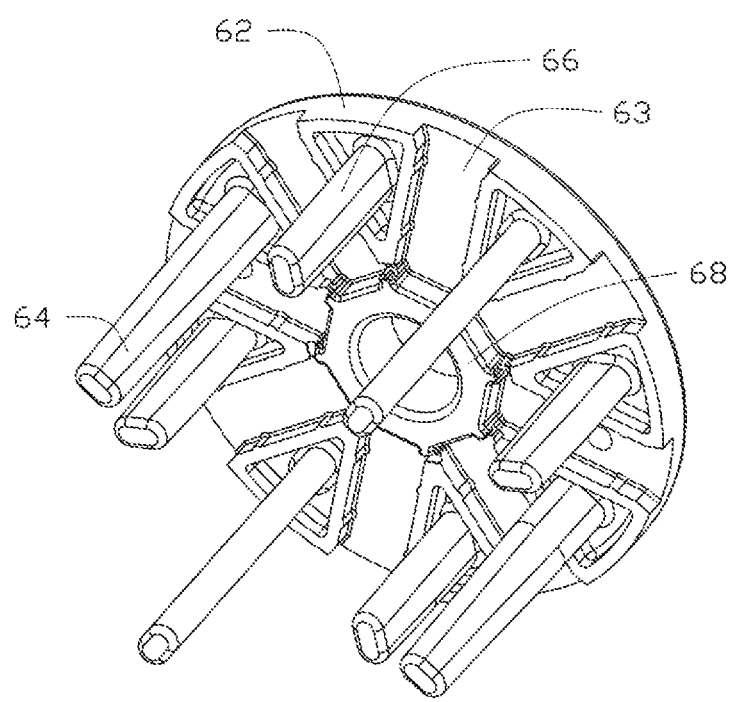
FIG. 8 illustrates a second end plate of the rotor of FIG. 5.

FIG. 8 illustrates a second end plate of the rotor of FIG. 5. In the embodiment, the second end plate 60 includes a second main body 62, a second long pin 64, a second short pin 66, and a second sleeve 68. The second main body 62 is substantially disc-shaped, and has a plurality of second grooves 63 formed on an end surface of the second main body 62. The second grooves 63 are configured to receive the lower portion of the permanent magnet 52 extending outside the rotor core 51. Preferably, the permanent magnet 52 is press-fitted to the corresponding second groove 63. The second short pins 66 and the second long pins 64 are arranged around an axis of the second main body 62 and evenly spaced from each other. Each of the second pins 64, 66 is located between adjacent second grooves 63, extending perpendicularly from the end surface of the second main body 62. In the axial direction, the second long pins 64 are aligned with the first short pins 44, and the second short pins 66 are aligned with the first long pins 46. The second sleeve 68 has a cross section substantially the same as that of the first sleeve 48, but has an axial length much less than that of the first sleeve 48. The second sleeve 68 forms an extension of the first sleeve 48 and is fixed to the shaft 20. The second long pins 64 and second short pins 66 each have an oval-shape cross section, with the major axis thereof extending radially, the same as the first pins 44, 46.

The first end plate 40 and second end plate 60 are mounted from opposite axial ends of the rotor core, respectively. Each first short pin 44 is coaxial with a corresponding second long pin 64, and each first long pin 46 is coaxial with a corresponding second short pin 66. Each of the core units 70 defines a through hole (not labelled) extending axially through the core unit 70 and aligned with corresponding first and second pins 44, 54 or 66, 66. In a preferred embodiment, the cross section of the through holes correspond to the cross section of the first and second pins 44, 46, 64, 66.

An outer surface of the core unit 70 in the radial direction is a part of a cylindrical surface, matching with the inner surface of the rotor housing 30 of the rotor 5. Two lateral surfaces of the core unit 70 are smooth and planar.

Each of the permanent magnets 52 is substantially cuboid-shaped. The permanent magnets 52 and core units 70 are alternating, and cooperatively form the column. The rotor housing 30 is assembled from an end of the shaft 20 to cover the column formed by the permanent magnets 52 and core units 70. The permanent magnets 52 may be ferrite magnets. In this embodiment, a width of the permanent magnet 52 is generally the same as a distance between adjacent core units 70 in the circumferential direction. A radial length of the permanent magnet 52 is slightly larger than a radial length of the core unit 70. Two chamfers (not labelled) may be respectively formed at two corners of a radial outer side of the permanent magnet 52, to space the corners of the permanent magnet 52 from the adjacent core units 70, and thus reducing magnetic leakage and further improving the performance of the motor 1.

The core units 70 surround the shaft 20 and are evenly spaced from each other. Each accommodation is defined between adjacent core units 70 for receiving one permanent magnet 52 therein. The accommodation is substantially cuboid-shaped. In this embodiment, the outer surfaces of the permanent magnets 52 and core units 70 are substantially on the same column, attaching to the inner surface of the housing 30. A radially inner surface of each of the permanent magnets 50 is closer to the shaft 50 than inner surfaces of the adjacent core units 70, for decreasing magnetic flux leakage.

The first and second end plates 40, 60 are arranged on respective ends of the shaft 50. The first and second pins 44, 46, 64, 66 of the first and second end plates 40, 60 are inserted into the through holes of the cores 70. In this embodiment, each of the first short pins 44 of the first end plate 40 and a corresponding second long pin 64 of the second end plate 60 are complementary in length and inserted into the same through hole; and each of the first long pins 46 and a corresponding second short pin 66 are complementary in length and inserted into the same through hole.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:

1. A brushless direct current motor, comprising:
   a stator, comprising a stator core and a winding wound around the stator core; and
   a spoke type rotor rotatable relative to the stator, comprising:
   a shaft;
   a rotor core, comprising a plurality of accommodations arranged along a circumferential direction of the rotor, each of the accommodations substantially extending along a radial direction and an axial direction of the rotor; and
   a plurality of permanent magnets respectively arranged at corresponding accommodations, the permanent magnets being substantially cuboid-shaped;
   wherein a relationship of an axial length Lr of the rotor core, an axial length Lm of each of the permanent magnets, and an axial length Ls of the stator core is that Lm>Lr>Ls;
   wherein the axial length Lr of the rotor core satisfies the formula that Lr=A(Lm−Ls)+Ls, wherein A ranges from 0.4 to 0.8.

2. The brushless direct current motor according to claim 1, wherein A ranges from 0.5 to 0.7.

3. The brushless direct current motor according to claim 1, wherein the stator core is formed by laminating a plurality of core laminations, the stator core comprises an annular yoke and a plurality of teeth extending from the annular yoke, and the annular yoke and the teeth have the same axial length.

4. The brushless direct current motor according to claim 1, wherein each of the permanent magnets extends beyond two axial ends of the rotor core in the axial direction of the rotor.

5. The brushless direct current motor according to claim 4, wherein two portions of the permanent magnet axially beyond the rotor core have the same axial length.

6. The brushless direct current motor according to claim 1, wherein the rotor core extends beyond two axial ends of the stator core in the axial direction of the rotor.

7. The brushless direct current motor according to claim 6, wherein two portions of the rotor core axially beyond the stator core have the same axial length.

8. The brushless direct current motor according to claim 1, wherein each of the permanent magnets is cuboid-shaped.

9. The brushless direct current motor according to claim 8, wherein a radially inner surface of each of the permanent magnets is closer to the shaft than an inner surface of the rotor core.

10. The brushless direct current motor according to claim 1, wherein the rotor core comprises a plurality of core units evenly arranged along a circumferential direction of the rotor, and each accommodation is formed between two adjacent core units.

11. The brushless direct current motor according to claim 1, wherein the rotor further comprises two end plates respectively arranged at two axial ends of the rotor core and the permanent magnets, at least one of the end plates has a plurality of grooves, and each of the grooves is configured to receive a portion of the permanent magnet extending outside the rotor core.

12. The brushless direct current motor according to claim 11, wherein the shaft and one of the end plates are integrally formed through insert molding.

13. The brushless direct current motor according to claim 1, wherein the rotor further comprises a rotor housing surrounding the rotor core and the permanent magnets, and the rotor housing is made of magnetically permeable material.

14. A dual clutch transmission, comprising the brushless direct current motor according to claim 1.

* * * * *